Figure 1:
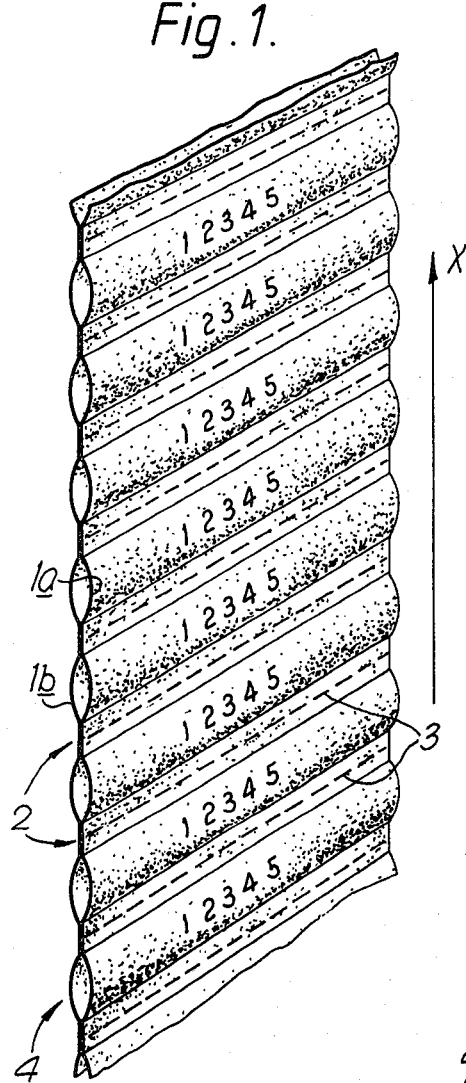

United States Patent [19]

Changani et al.

[11] 4,349,404
[45] Sep. 14, 1982

[54] POLYMERIC ARTICLES

[75] Inventors: Pushpkumar D. Changani, Swindon; Donald G. Peacock, Kempsford; David Roberts, Broome Manor Swindon, all of England

[73] Assignee: Raychem Corporation, Menlo Park, Calif.

[21] Appl. No.: 172,889

[22] Filed: Jul. 28, 1980

[51] Int. Cl.$^3$ .................. B29C 27/00; B29C 17/04
[52] U.S. Cl. .................. 156/308.4; 156/229; 156/218; 156/86
[58] Field of Search .................. 156/52, 84–86, 156/218, 290–294, 229, 304.1, 304.2, 304.6, 307.1, 308.4

[56] References Cited

U.S. PATENT DOCUMENTS

| 518,403 | 6/1955 | Goodwin . | |
|---|---|---|---|
| 3,239,125 | 3/1966 | Sherlock | 228/56 |
| 3,243,211 | 3/1966 | Wetmore | 287/78 |
| 3,253,618 | 5/1966 | Cook | 138/125 |
| 3,253,619 | 5/1966 | Cook et al. | 138/125 |
| 3,305,625 | 2/1967 | Ellis | 174/84 |
| 3,316,343 | 4/1967 | Sherlock | 174/84 |
| 3,382,121 | 5/1968 | Sherlock | 156/165 |
| 3,396,894 | 8/1968 | Ellis | 228/56 |
| 3,448,182 | 6/1969 | Derbyshire | 264/22 |
| 3,451,609 | 6/1969 | Gillett | 228/56 |
| 3,501,565 | 3/1970 | Kalwaites | 264/288 |
| 3,525,799 | 8/1970 | Ellis | 174/84 |
| 3,654,017 | 4/1972 | Ropiequet | 156/251 |
| 3,678,174 | 7/1972 | Ganzhorn | 174/84 R |
| 3,721,749 | 3/1973 | Clabburn | 174/88 R |
| 3,818,123 | 6/1974 | Maltz | 174/88 C |
| 3,872,194 | 3/1975 | Lowry | 264/22 |
| 3,899,807 | 8/1975 | Sovish | 24/255 C |
| 3,948,709 | 4/1976 | Ida | 156/209 |
| 3,949,110 | 4/1976 | Nakajima | 428/36 |
| 3,995,964 | 12/1976 | De Groef | 403/272 |
| 4,085,286 | 4/1978 | Horsma | 156/86 |
| 4,101,699 | 7/1978 | Stine | 428/36 |
| 4,118,260 | 10/1978 | Boettcher | 156/85 |

FOREIGN PATENT DOCUMENTS

| 1154280 | 4/1958 | France . |
| 990235 | 4/1965 | United Kingdom . |
| 1010064 | 11/1965 | United Kingdom . |
| 1046367 | 10/1966 | United Kingdom . |
| 1284082 | 8/1972 | United Kingdom . |
| 1286460 | 8/1972 | United Kingdom . |
| 1294665 | 11/1972 | United Kingdom . |
| 1334556 | 10/1973 | United Kingdom . |
| 1334969 | 10/1973 | United Kingdom . |
| 1342202 | 1/1974 | United Kingdom . |
| 1357549 | 6/1974 | United Kingdom . |
| 1454838 | 11/1976 | United Kingdom . |
| 1545386 | 5/1979 | United Kingdom . |

Primary Examiner—John E. Kittle
Attorney, Agent, or Firm—James W. Peterson; Herbert G. Burkard

[57] ABSTRACT

A process for the production of a marker sleeve assembly which comprises deforming a substantially non-cross-linked web of polymeric material at a temperature below the crystalline melting point or softening point of the material to render the web heat-recoverable, fusing together parts of the web or parts of the web and at least one other polymeric web to define a plurality of radially inwardly heat-recoverable marker sleeves, disposed in side-by-side relationship and preferably separable and subsequently cross-linking the resulting assembly.

10 Claims, 9 Drawing Figures

POLYMERIC ARTICLES

The present invention concerns heat-recoverable polymeric articles, that is to say, articles the dimensional configuration of which may be made to change by subjecting to heat, and in particular, to such articles for use as identifying markers and to a process for their manufacture.

Identifying markers are frequently employed for identifying the components of complicated equipment particularly complex electrical equipment, for example complex wiring systems in aircraft. One such marker system has taken the form of an assembly of heat-recoverable sleeves which may be marked in any manner and which may be slipped over the component to be identified and heat-recovered thereon. Such assembly comprises an elongate spine provided on one side thereof with a plurality of transversely extending spaced apart support bars on each of which is disposed a heat-recoverable marker sleeve. Such an assembly facilitates marking and sequencing of the marker sleeves and if necessary furthermore enables the marker sleeves to be subjected to heat treatment to fix or render permanent the markings on the sleeve without risk of premature heat-recovery.

Whilst such marker sleeve assembly has many attributes, the manufacture thereof is complex. The marker sleeves are manufactured from polymeric tubing which is rendered heat recoverable by cross-linking the tubing, heating the tubing to a temperature above the crystalline melting point or softening point of the polymeric material, deforming the tube radially outwardly and cooling the tubing in the deformed state. In use, since the deformed state of the article is heat unstable, application of heat will cause the tubing to revert to the original heat stable configuration. The tubing so produced is cut down into a plurality of short sleeves each of which are then individually disposed on the support bars of the elongate spine and located thereon by slight heat recovery, the sleeves so located still retaining a substantial residual amount of heat recovery.

The present invention has as an object to provide a process for the production of an alternative type of heat-recoverable marker sleeve assembly which is less complex than that hitherto employed.

Accordingly, the present invention provides a process for the production of a marker sleeve assembly which comprises deforming a substantially non-cross-linked web of polymeric material at a temperature below the crystalline melting point or softening point of the material to render the web heat-recoverable, fusing together parts of the web or parts of the web and at least one other polymeric web to define a plurality of radially inwardly heat-recoverable marker sleeves, disposed in side-by-side relationship and preferably separable and subsequently cross-linking the resulting assembly.

By the expression "fusing together" as employed herein is meant a process wherein the materials in the parts to be fused together are caused to flow together, e.g. welding by heat, solvent, or ultrasonic or radio frequency energy, preferably with the application of pressure, to form a homogeneous bridge between the parts in the absence of any discernible interface therebetween.

The fusion step may be effected before or after deformation, preferably however after deformation.

Preferably, the marker sleeve assembly is produced in a "tear-off" arrangement being provided with lines of weakness, e.g. perforations, facilitating separation and removal of individual marker sleeves from the assembly, as required.

The marker sleeves may be provided with identifying characters or other markings at any stage in the production process, e.g. on the polymeric web before or after the fusing step. Alternatively, the sleeves may be produced devoid of identifying markings, these to be provided by the user, e.g. by a typing operation.

In a first preferred form of the invention, the assembly is produced from at least one pair of longitudinally expanded non-cross-linked polymeric sheets which are superimposed and welded together laterally thereof at longitudinally spaced apart intervals. Preferably the weld seams defining the laterally extending marker sleeves are provided with lines of weakness, e.g. are perforated to facilitate separation of the sleeves.

If it is desirable to enable individual marker sleeves to be removed out of sequence without disturbing the sequence of the remaining sleeves, then provision may be made for a retaining spine along one edge of the assembly. For example the assembly may be provided with a longitudinally extending line of weakness, the marker sleeves so being bounded by one free edge, the welded seams and said longitudinally extending line of weakness. In such case, said line of weakness may comprises a series of slits, each slit extending across the width of the marker sleeves, the welded seams forming a bridge between the sleeves and the spine. In such case also, one sheet may advantageously be wider than the other of the or each pair of sheets, the spine in such case consisting of the one edge region of the wider sheet.

In such first preferred form, said pair(s) of polymeric sheets may be attached to a non-heat-recoverable support means to restrain heat-recovery of the marker sleeves under heat treatment to fix or render permanent markings on the sleeves. Such support means may comprise a strip to which, or, to each side of which, a pair of polymeric sheets as hereinbefore described may be secured, at least at the extremities thereof.

In a second preferred form of the invention, the assembly is produced from a single longitudinally expanded sheet which is folded laterally thereof at spaced apart intervals and welded laterally along the base of each fold to provide a plurality of spaced apart laterally extending marker sleeves. Preferably in such form also, perforations are provided along the weld seams to facilitate removal of the sleeves. Such form has the advantage that sleeves may be removed at any position in the assembly permitting the assembly to remain otherwise intact.

In a third preferred form of the invention, the assembly is produced from at least one pair of longitudinally expanded non-cross-linked polymeric sheets which are superimposed onto at least one side of a non-expanded polymeric support strip said pair of sheets being welded together and to the support strip laterally of the sheets at longitudinally spaced apart intervals. Preferably the weld seams defining the laterally extending weld seams are perforated to facilitate their separation. Such third preferred form has the advantage that sleeves at any position in the assembly may be removed whilst permitting the assembly otherwise to remain intact. Further, by appropriate choice of support strip material the assembly may be subjected to heat treatment to fix or render permanent the identifying markings on the sleeves, without causing the sleeves to loose their heat-recovery, e.g. by choice of a support strip material that remains semi-rigid at the heat treatment temperature. When a support strip is employed, a pair of expanded polymeric sheets may be welded to each face thereof to provide marker sleeves on both faces.

The assembly may be provided longitudinally thereof with a plurality of indexing slots or apertures adapted to be engageable with the teeth of a sprocket mechanism to be advanceable through a printer, e.g. a typewriter, and so facilitate marking. For example in the case where the assembly is provided with a longitudinally extending exposed spine or support strip, the indexing slots or apertures may be provided in said spine or strip.

The process is applicable to both crystalline and non-crystalline polymers, the crystalline melting point or softening point being selected accordingly as the maximum deformation temperature.

By "substantially non-cross-linked" polymeric materials as employed herein is meant not cross-linked to the extent that the material cannot be readily bonded to itself or to another polymeric component by fusing. In general, the level of cross-linking in the polymeric material expressed in terms of gel content (ANSI/ASTM D2765-68) is preferably less than 40%, more preferably less than 20%, particularly less than 5%. When cross-linking in accordance with the process, preferably gel contents of at least 40%, e.g. at least 50%, particularly at least 65% are attained.

Marker sleeves and a marker sleeve assembly produced by the process of the invention also form part of the present invention.

One advantage of the marker sleeves of the invention is that they are substantially recoverable, e.g. recoverable to at least 50% of their maximum extent, at a temperature below the crystalline melting point or softening point of the polymeric material from which they have been produced, e.g. in the range 60° C. to the crystalline melting point or softening point.

Any cross-linkable polymeric material to which the property of dimensional recoverability may be imparted such as those disclosed in U.K. specification No. 990,235 may be used to form the articles. Polymers which may be used in the polymeric material include polyolefins such as polyethylene and polypropylene, and ethylene copolymers, for example with propylene, butene, hexene, octene, vinyl acetate or other vinyl esters or methyl or ethyl acrylate, polyamides, polyurethanes, polyvinyl chloride, polyvinylidine fluoride, or other fluorinated polymers or copolymers, e.g. Tefzel (trade name—commercially available from Dupont), elastomeric materials such as those disclosed in U.K. specification No. 1,010,064 and blends such as those disclosed in U.K. specification Nos. 1,284,082 and 1,294,665, and compositions such as those disclosed in our co-pending Application Nos. 15122/77 and 37468/78. The polymeric materials can be tailored to suit the intended use by the addition of fillers or other additives, e.g. flame retardants, plasticisers, pigments, stabilisers and lubricants.

The polymeric material may be cross-linked by irradiation, for example, by means of an electron beam or by γ-radiation or it may be chemically cross-linked. Whichever cross-linking process is used, it may be advantageous to incorporate one or more co-curing agents for example polyunsaturated monomers such as triallyl cyanurate, triallyl isocyanurate, diallyl phthalate, ethylene glycol dimethacrylate, trimethylolpropane trimethacrylate, pentaerythritol tetramethyacrylate, allyl methacrylate and vinyl methacrylate. One method of chemical cross-linking that may be used in the process according to the invention involves grafting an unsaturated hydrolysable silane on the polymer and subjecting the article to moisture during a curing stage, for example, as described in U.K. specification Nos. 1,286,460 and 1,357,549.

Any of the techniques conventionally employed for fusing together polymeric materials may be employed in the process of the present invention, e.g. radio frequency, ultrasonic or hot bar welding, and pressure may additionally be applied to ensure a satisfactory bond. Furthermore, it is possible to make use of the fusing operation to provide lines of weakness, e.g. perforations between the marker sleeves of the assembly. For example, it is possible to use a heating/perforating device such as a welding tool provided with a toothed wheel, if necessary in association with pressure applying means such as a roller.

The wall thickness of the marker sleeves may vary, e.g. from 0.01 to 3 mm prior to heat-recovery, preferably from 0.1 to 1 mm.

Figure 2:
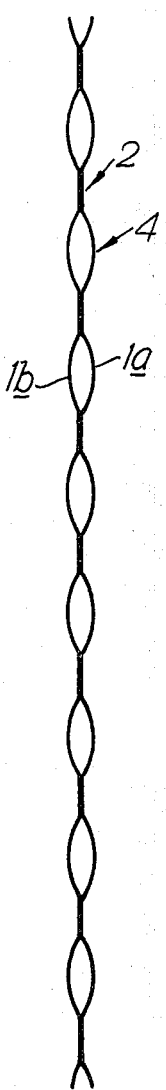
Figure 3:
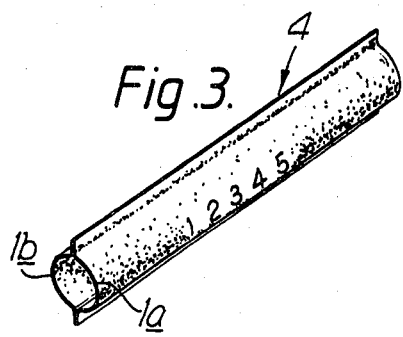
Figure 4:
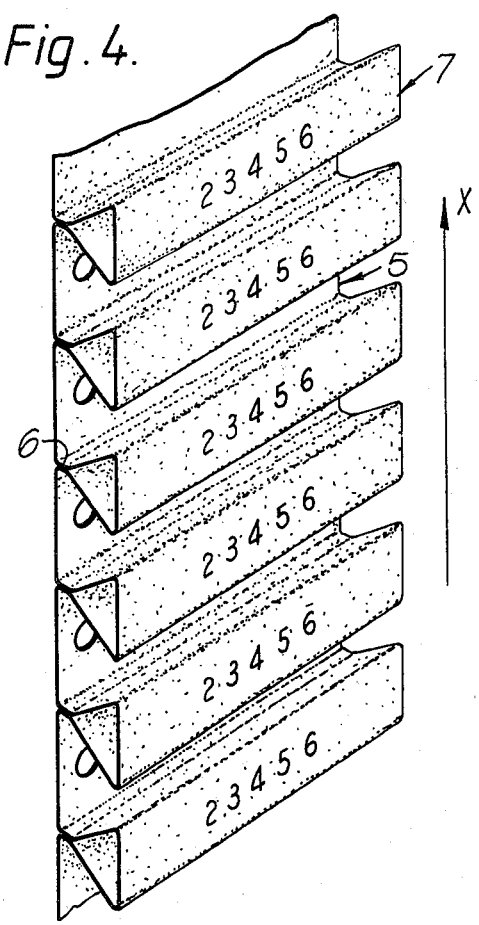
Figure 5:
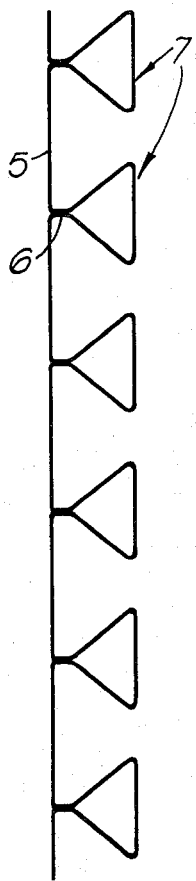
Figure 6:
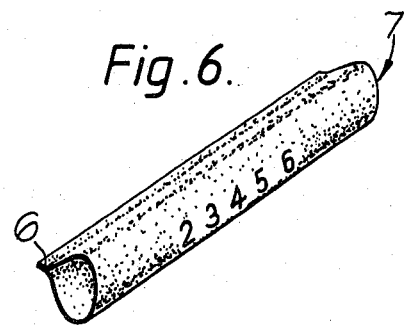
Figure 7:
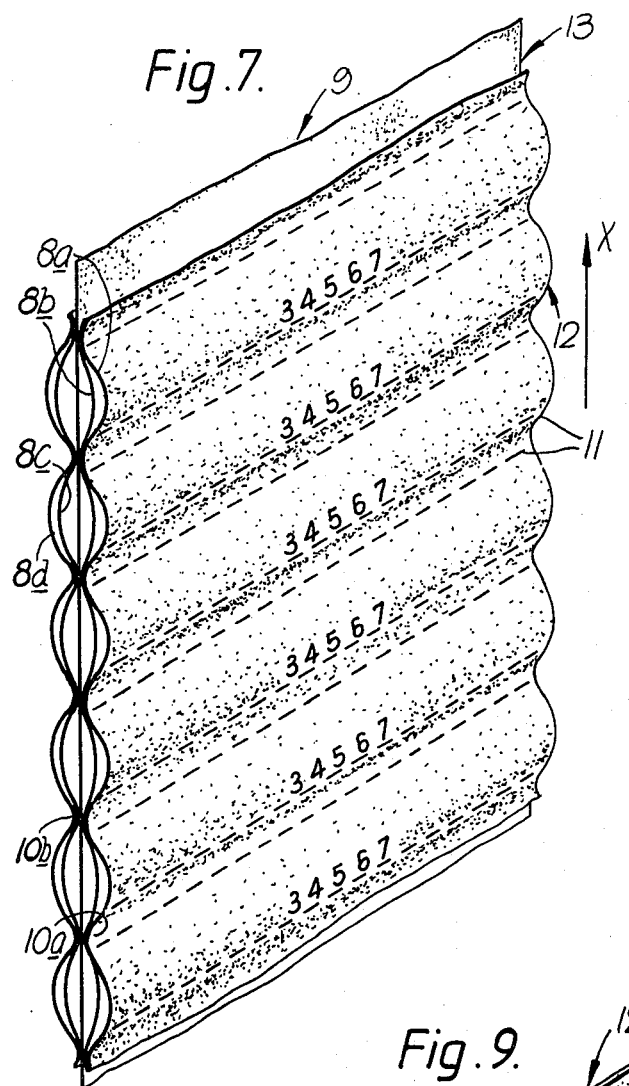
Figure 8:
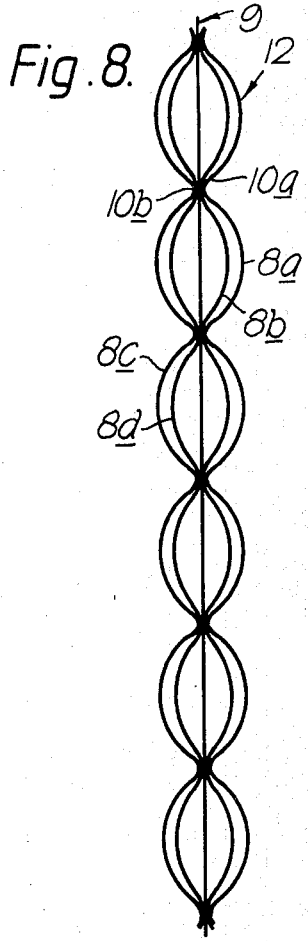
Figure 9:
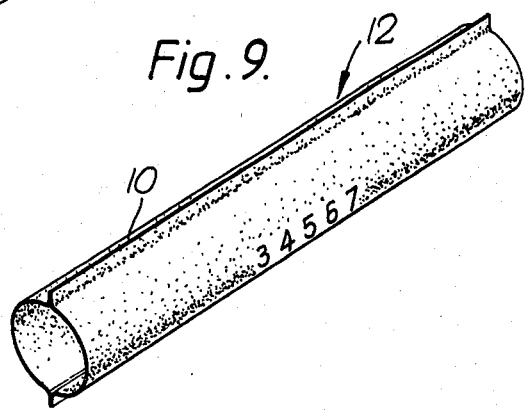

Specific embodiments of the process of the invention will now be described by way of example with specific reference to the accompanying drawings wherein:

FIG. 1 is a schematic side view of a marker sleeve assembly in accordance with a first embodiment of the invention, FIG. 2 shows a section through the assembly of FIG. 1, FIG. 3 is a side view of a single marker sleeve detached from the assembly of FIG. 1, FIG. 4 is a schematic side view of a marker sleeve assembly in accordance with a second embodiment of the invention, FIG. 5 shows a section through the assembly of FIG. 4, FIG. 6 is a schematic side view of a single marker sleeve detached from the assembly of FIG. 4, FIG. 7 is a schematic side view of a marker sleeve assembly in accordance with a third embodiment of the invention, FIG. 8 shows a section through the assembly of FIG. 7, and, FIG. 9 is a side view of a single marker sleeve detached from the assembly of FIG. 7.

With reference to FIGS. 1, 2 and 3 the marker sleeve assembly of the first embodiment is produced from a pair of superimposed non-cross-linked polyethylene sheets each of which having been deformed by stretching in a longitudinal direction depicted in FIG. 1 by arrow X at a temperature of 100° C. and allowed to cool in the deformed condition. The superimposed deformed sheets are welded together laterally thereof with an RF welding tool to produce weld seams 2 and define a plurality of spaced apart marker sleeves 4. The assembly is provided with lines of weakness in the form of perforations 3 disposed along the weld seams 2 to facilitate removal of individual sleeves 4. The assembly is thereafter irradiated with a 1.5 MeV electron beam at a dosage of 12 Mrads causing cross-linking of the polyethylene. The assembly of blank marker sleeves may be provided with appropriate markings, e.g. by use of a normal typewriter.

The resulting marker sleeve assembly is simply produced yet provides a sequenced series of heat-recoverable marker sleeves which may be employed for identifying purposes in manner known per se.

In a modification (not shown) of the first embodiment to enable the marker sleeve assemblies when provided with identifying markings, e.g. from a typewriter, to be subjected to a heat treatment to fix or render permanent the markings on the sleeves, each assembly is provided with a support means in the form of a polymeric non-heat-recoverable polymeric strip which remains at least semi-rigid at the heat treatment temperature, attached to at least each extremity of the assembly. Such attachment may be achieved by the use of mechanical attachment means e.g. clips, or may be welded to the assembly prior to cross-linking at least to the terminal sleeves of the assembly.

In the second embodiment illustrated in FIGS. 4, 5, and 6, the assembly is produced from a single sheet of non-cross-linked longitudinally expanded polyethylene sheets, i.e. expanded in the direction indicated by arrow X in FIG. 4, produced in analogous manner to that described in the first embodiment, the sheet being transversely folded at longitudinally spaced apart intervals and each fold being welded employing an RF welding tool along the base thereof to produce weld seams 6 and thereby define a plurality of interlinked laterally disposed spaced apart sleeves 7. Between each sleeve 7 so produced and the interlinking polyethylene sheet along the weld seams 6 are provided lines of weakness in the form of a line of perforations to permit a tear-off arrangement and facilitate detachment of individual sleeves. The assembly so produced is subjected to electron irradiation and thereafter provided with identifying characters in analogous manner to that described in relation to the first embodiment. It is to be noted that the assembly of the second embodiment permits a marker sleeve to be removed out of sequence, i.e. from any position in the assembly the assembly otherwise remaining intact.

In the third embodiment illustrated in FIGS. 7, 8 and 9, two pairs of longitudinally expanded polyethylene sheets 8a and 8b, 8c and 8d (i.e. expanded in the direction indicated by arrow X) each produced in accordance with the procedure described in relation to the first embodiment are placed one pair on each side of a non-cross-linked semi-rigid polymeric support strip 9 in stacked relationship and each pair of polyethylene sheets 8a and 8b and 8c and 8d welded together and to each face of the polymeric support strip laterally thereof at spaced apart intervals employing an RF welding tool to produce welded seams 10a and 10b on each side of support strip 9 and to define a plurality of laterally disposed spaced apart marker sleeves 12 on each side of the support strip 9. Each weld seam 10a or 10b is provided with two rows of perforations in region of the seams not directly integral with the support strip to facilitate detachment of the marker sleeves. The relative width of the support strip 9 and polymeric sheets 8 is such that the marker sleeves protrude slightly from one side edge 13 of the support strip to provide a convenient securing tab to facilitate removal of the sleeves. The assembly is then subjected to electron irradiation as described in relation to the first embodiment, the assembly then being in a condition to accept markings, e.g. by way of a typewriter and to undergo heat treatment to render permanent the markings. It should be noted that the polymeric material of the support strip 9 is selected such that it will remain sufficiently rigid at the heat treatment temperature as to prevent premature heat-recovery of the marker sleeves.

It is to be noted that apart from allowing heat treatment to render permanent markings on the sleeves, the assembly also has a high density of marker sleeves and permits any marker sleeve to be detached whilst otherwise remaining intact.

In a modification of the third embodiment (not shown), the support strip extends proud of the marker sleeves on the side thereof opposite to side 13 to expose one edge region thereof.

Along the edge region so exposed is provided a series of slots or apertures which are adapted to be engageable with the teeth of a sprocket mechanism to be advanceable through a printer e.g. a typewriter and so facilitate marking.

We claim:

1. A process for the production of a marker sleeve assembly, the steps comprising:
    deforming a substantially non-cross-linked web of polymeric material at a temperature below the crystalline melting point or softening point of the material to render the web heat-recoverable primarily in one direction;
    fusing together parts of the web to one other substantially non-cross-linked polymeric web said fusing being done along lines substantially perpendicular to the direction of web heat recoverability to define a plurality of radially inwardly heat-recoverable marker sleeves disposed in side by side relationship; and
    cross-linking the fused portions of the polymeric material.

2. A process according to claim 1 further including the step of introducing into the assembly lines of weakness which facilitate detachment of individual sleeves.

3. A process according to claim 2 wherein said lines of weakness comprise perforations.

4. A process according to claim 1 wherein a pair of longitudinally expanded non-cross-linked polymeric sheets are superimposed and welded together laterally thereof at longitudinally spaced apart intervals.

5. A process according to claim 4 further including the step of attaching the pair of polymeric sheets to a non-heat-recoverable support means to restrain heat-recovery of the marker sleeves under heat treatment, said marker sleeves being detachable from said support means after heat treatment.

6. A process according to claim 5 wherein the support means is in the form of a polymeric strip and said polymeric sheets are detachably attached at least at the extremities thereof to the support means.

7. A process according to claim 6 wherein the polymeric sheets are welded to the support means at the positions that the polymeric sheets are welded together.

8. A process according to claim 5 wherein a pair of polymeric sheets are detachably attached to each surface of the support means.

9. A process according to claim 1 wherein a non-cross-linked polymeric sheet is longitudinally expanded to determine the direction of heat recoverability and wherein the sheet is folded laterally thereof at longitudinally spaced apart intervals and each fold welded laterally along the base thereof to produce a plurality of spaced apart laterally extending marker sleeves.

10. A process according to claim 1 wherein the assembly is provided with longitudinally disposed indexing apertures or slots.

* * * * *